United States Patent
Saito

(10) Patent No.: US 7,528,865 B2
(45) Date of Patent: May 5, 2009

(54) DIGITAL MOVIE CAMERA AND METHOD OF CONTROLLING OPERATIONS THEREOF

(75) Inventor: Osamu Saito, Asaka (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 522 days.

(21) Appl. No.: 10/300,823

(22) Filed: Nov. 21, 2002

(65) Prior Publication Data

US 2003/0095191 A1 May 22, 2003

(30) Foreign Application Priority Data

Nov. 22, 2001 (JP) .............................. 2001-356838

(51) Int. Cl.
*H04N 5/225* (2006.01)
*H04N 5/222* (2006.01)

(52) U.S. Cl. ............................... 348/220.1; 348/333.01

(58) Field of Classification Search .............. 348/220.1, 348/221.1, 333.01, 333.05, 207.99, 333.11, 348/333.12
See application file for complete search history.

(56) References Cited

U.S. PATENT DOCUMENTS

| | | | | |
|---|---|---|---|---|
| 5,495,342 | A * | 2/1996 | Harigaya et al. | 386/121 |
| 5,734,424 | A * | 3/1998 | Sasaki | 348/222.1 |
| 5,899,575 | A * | 5/1999 | Okayama et al. | 386/46 |
| 6,069,994 | A * | 5/2000 | Kozuki et al. | 386/121 |
| 6,122,003 | A * | 9/2000 | Anderson | 348/207.99 |
| 6,148,031 | A * | 11/2000 | Kato | 375/240.13 |
| 6,292,218 | B1 * | 9/2001 | Parulski et al. | 348/220.1 |
| 6,359,643 | B1 * | 3/2002 | Visvanathan et al. | 348/14.14 |
| 6,359,649 | B1 * | 3/2002 | Suzuki | 348/220.1 |
| 6,871,010 | B1 * | 3/2005 | Taguchi et al. | 386/120 |
| 6,937,273 | B1 * | 8/2005 | Loui | 348/220.1 |
| 6,992,707 | B2 * | 1/2006 | Obrador | 348/220.1 |
| 2001/0028396 | A1 * | 10/2001 | Sato | 348/220 |
| 2002/0001035 | A1 * | 1/2002 | Haneda | 348/220 |
| 2003/0090571 | A1 * | 5/2003 | Scheurich | 348/207.1 |

FOREIGN PATENT DOCUMENTS

| | | |
|---|---|---|
| JP | 5-22686 | 1/1993 |
| JP | 7-135592 | 5/1995 |
| JP | 2000-308076 | 2/2000 |
| JP | 2000-175206 | 6/2000 |
| JP | 2000-352759 | 12/2000 |
| JP | 2001-69396 | 3/2001 |
| JP | 2001-78137 | 3/2001 |

OTHER PUBLICATIONS

Notification of Reasons for Refusal with English Translation dated Jan. 19, 2006.
Japanese Office Action dated Aug. 8, 2006 (with English translation).

* cited by examiner

*Primary Examiner*—David L Ometz
*Assistant Examiner*—Richard M Bemben
(74) *Attorney, Agent, or Firm*—McGinn IP Law Group, PLLC

(57) ABSTRACT

When a continuous imaging mode is set while a movie image is being recorded, continuous imaging is performed. When a movie image pick-up mode is set, a CCD is brought into a movie image readout mode, in which movie image data representing a movie image is periodically outputted. An image corresponding to one of frames constituting the movie image is of a relatively low image quality. When a determination switch is pressed, the CCD enters a movie image recording mode, in which the movie image data is recorded on a memory card. When a shutter release button is pressed in a case where the movie image recording mode is set, the CCD enters a still image recording mode, in which still image data of a relatively high image quality is outputted. Until still image data corresponding to a predetermined number of continuously imaged frames are obtained, the continuous imaging is repeated. When the still image data corresponding to the predetermined number of continuously imaged frames are obtained, the CCD enters a movie image readout mode.

17 Claims, 9 Drawing Sheets

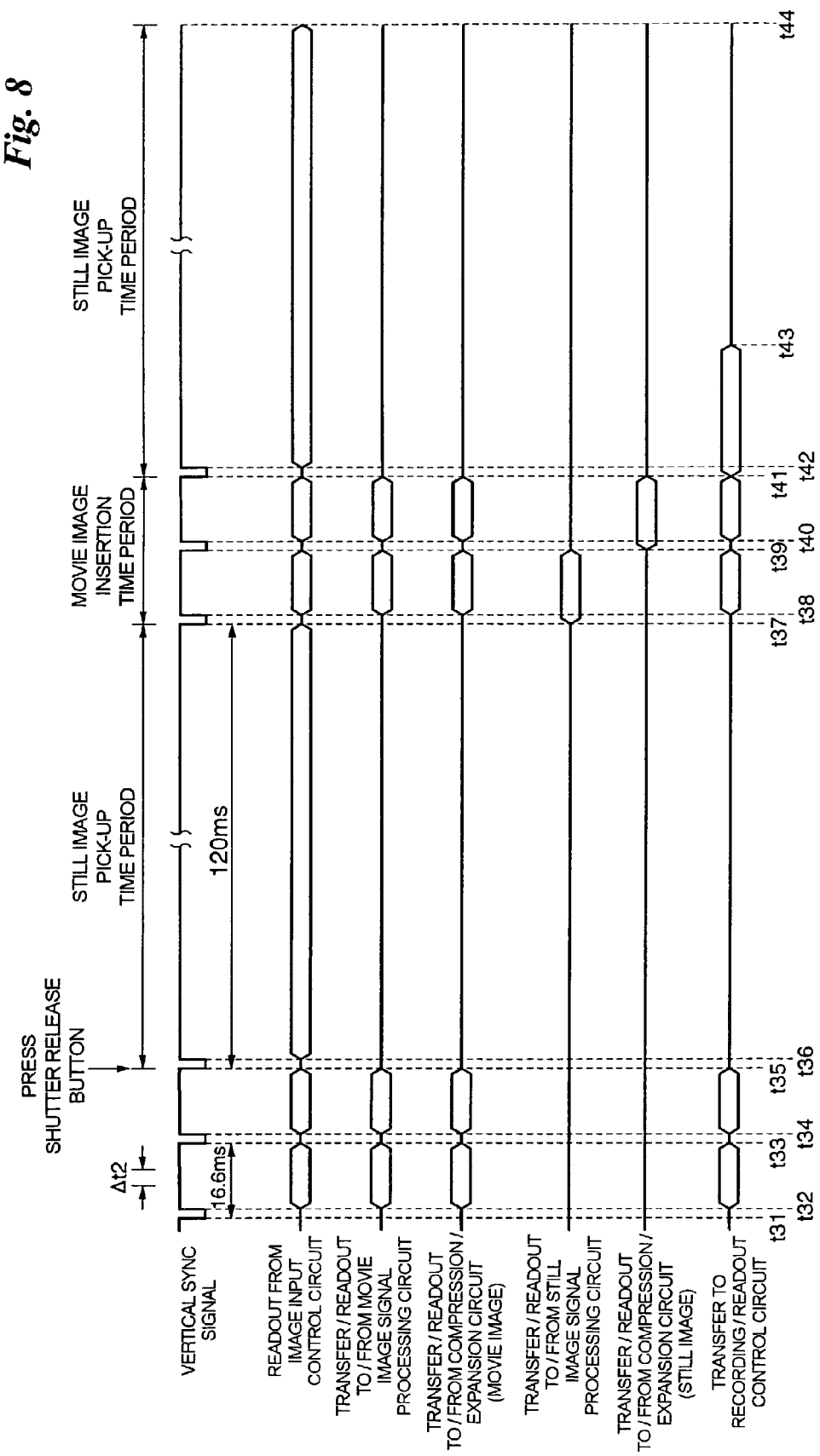

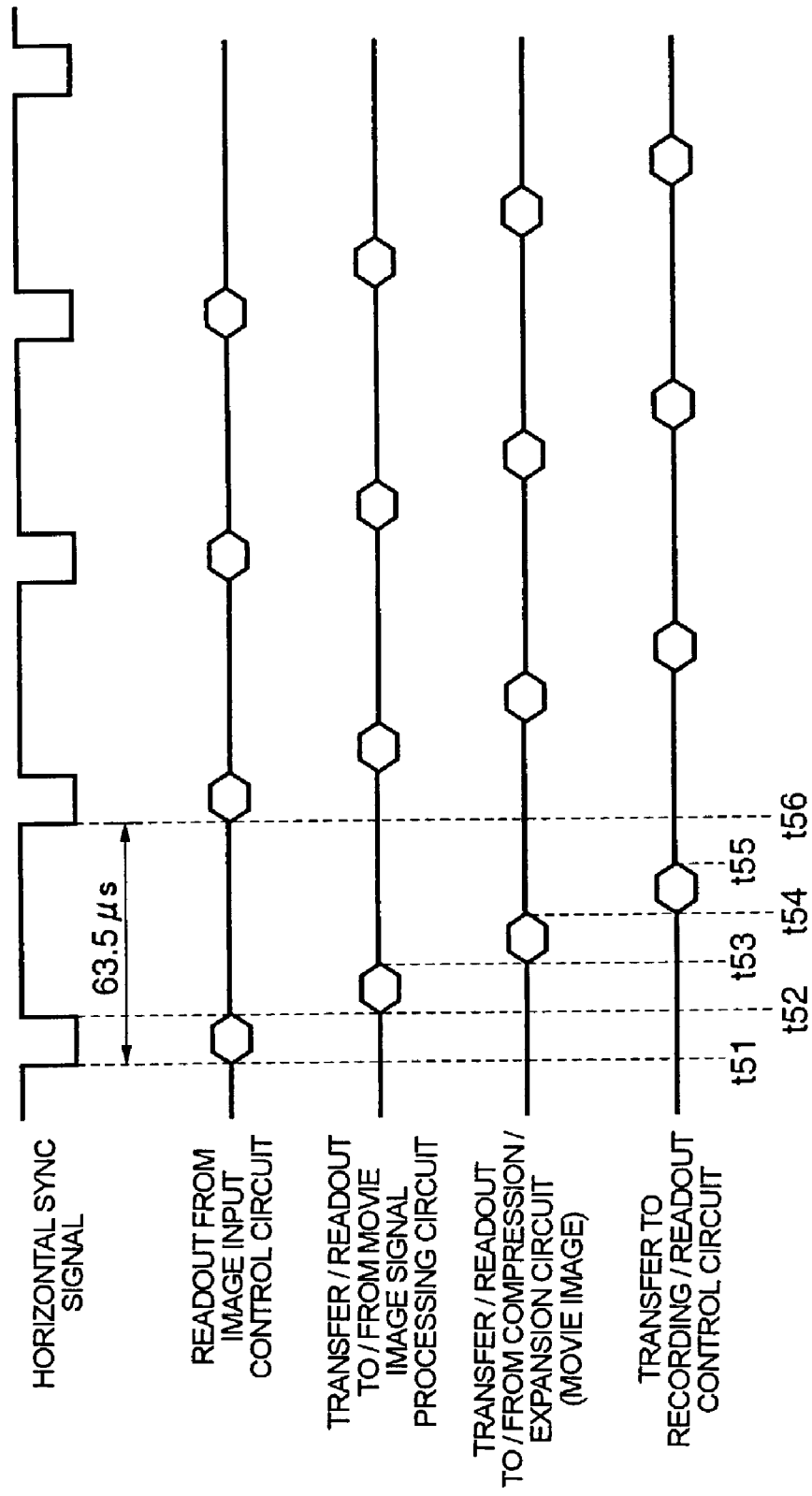

DIGITAL MOVIE CAMERA AND METHOD OF CONTROLLING OPERATIONS THEREOF

BACKGROUND OF THE INVENTION

1. Field of the Invention

The present invention relates to a digital movie camera and a method of controlling the operations thereof.

2. Description of the Background Art

Digital movie cameras image or pick up a subject in a predetermined period (e.g., 1/60 seconds), and record movie (moving) image data obtained by the imaging on recording media such as a video tape and a memory card. Examples of the digital movie cameras include one having the function of still recording for imaging a subject at the timing of pressing a shutter release button while the movie image data is being recorded and recording obtained image data on a recording medium (a so-called digital movie still camera).

However, such a digital movie still camera only adds data indicating that a shutter release button is pressed to an image data picked up when the shutter release button is pressed out of image data representing images corresponding to frames constituting a movie image. The resolution of the images constituting the movie image and the resolution of a still image are the same. Further, it is not considered that continuous imaging is performed while the movie image is being recorded.

SUMMARY OF THE INVENTION

An object of the present invention is to record on a recording medium still image data of a high quality corresponding to a plurality of frames obtained by continuous imaging even in a case where a movie image recording mode for recording movie image data is set.

A digital movie camera according to the present invention is characterized by comprising imaging means (an imaging device) including a solid-state electronic imaging device for imaging a subject and outputting image data (an image signal) representing an image of the subject; first driving means (a first driving device) for driving the solid-state electronic imaging device so as to image the subject in a predetermined period and read out movie image data in response to the setting of a movie image recording mode; moving image recording control means (a movie image recording control device) for recording image data representing the movie image read out of the solid-state electronic imaging device under driving by the first driving means as movie image data on a recording medium; second driving means (a second driving device) for driving the solid-state electronic imaging device so as to continuously image the subject at timing corresponding to a continuous imaging time period and read out still image data in response to the setting of a continuous imaging mode during operations by the movie image recording mode (the first driving means (device) and the second driving means (device) maybe the same); and still image recording control means (a still image recording control device) for recording image data representing the still image read out of the solid-state electronic imaging device under driving by the second driving means as still image data on the recording medium.

The present invention also provides a method of controlling the operations of the above-mentioned digital movie camera. That is, the method comprises the steps of imaging a subject using imaging means (an imaging device) including a solid-state electronic imaging device, to obtain image data representing an image of the subject; driving the solid-state electronic imaging device so as to pick up the subject image in a predetermined period and read out moving image data in response to the setting of a movie image recording mode; recording image data representing the movie image read out of the solid-state electronic imaging device as movie image data on a recording medium; driving the solid-state electronic imaging device so as to continuously image the subject at timing corresponding to a continuous imaging time period and read out still image data in response to the setting of a continuous imaging mode during operations by the movie image recording mode; and recording image data representing the still image read out of the solid-state electronic imaging device as still image data on the recording medium.

The continuous imaging is imaging of a still image (obtaining still image data) performed successively.

According to the present invention, when the movie image recording mode is set, the solid-state electronic imaging device is driven so as to image the subject in a predetermined period and read out the movie image data (for recording the movie image data and preferably reading out a part of image data obtained from an effective pixel region of the solid-state electronic imaging device by thinning or the like). The image data outputted from the solid-state electronic imaging device is recorded as the movie image data on the recording medium. When the continuous imaging mode is set during the operations by the movie image recording mode, the solid-state electronic imaging device is driven so as to continuously image the subject at the timing corresponding to the continuous imaging time period and read out the still image (for recording the still image and preferably substantially reading out all image data obtained from the effective pixel region of the solid-state electronic imaging device). When the operation of the continuous imaging mode is terminated (continuous imaging is terminated), the subject is imaged again in a predetermined period, and the solid-state electronic imaging device is driven such that the movie image is read out.

When the continuous imaging mode is set even in a case where the movie image recording mode is set so that the movie image data is recorded on the recording medium, the continuous imaging mode is started. The still image data corresponding to a plurality of frames obtained by the continuous imaging can be recorded on the recording medium even during the operations by the movie image recording mode. Particularly when the continuous imaging mode is set, the solid-state electronic imaging device is driven such that an image data to be read out is changed from the movie image to the still image. Accordingly, the still image data, corresponding to the plurality of frames, having a high resolution is obtained. If the number of continuously imaged frames is one, the imaging is substantially single still imaging. Therefore, it goes without saying that the still image data, corresponding to one frame, of a high image quality is obtained.

The digital movie camera may further comprise driving control means (a driving control device) for controlling the first driving means so as to image the subject in a predetermined period within a movie image insertion time period which is a part of the continuous imaging time period and read out the movie image data.

Since the subject is imaged in a predetermined period even in the movie image insertion time period which is a part of the continuous imaging time period, movie image data is obtained, and the obtained movie image data is recorded on the recording medium. Even during the continuous imaging, the movie image data can be recorded. The recording of the movie image data is not stopped in a time period during which the continuous imaging mode is set, but the movie image data is recorded in a part of the continuous imaging time period.

Even when the obtained movie image data is reproduced, therefore, a movie image which smoothly moves is obtained.

The digital movie camera may further comprise display means (a display device) for displaying the subject image represented by the image data outputted from the imaging means. In this case, when the movie image recording mode is set, the movie image represented by the movie image data obtained by the imaging is displayed. When the continuous imaging mode is set while the movie image recording mode is being set, the movie image is displayed in the movie image insertion time period even during the continuous imaging. During the continuous imaging, the not only still image is displayed, but the movie image is displayed in a part of the continuous imaging time period. Accordingly, a main subject can be followed relatively easily while seeing the movie image displayed on the display device.

The digital movie camera may further comprise a buffer memory successively temporarily storing image data corresponding to a plurality of frames outputted from the imaging means, readout means (a readout device) for reading out the image data stored in the buffer memory and feeding the read image data to the display device, and readout control means (a readout control device) for controlling, in a still image processing time period excluding the movie image insertion time period in the continuous imaging time period, the readout means so as to display on the display device the image of the subject which is imaged during the movie image insertion time period immediately before the still image processing time period (preferably, the image of the subject imaged at the end of the movie image insertion time period).

An example of the still image processing time period is one comprising a still image pick-up time period required to image the subject and read out the image data from the solid-state electronic imaging device and a signal processing time period required to subject the image data outputted from the solid-state electronic imaging device to signal processing.

An example of the still image processing time period is one equal to a still image pick-up time period required to image the subject and read out the image data from the solid-state electronic imaging device, as described above. In this case, the digital movie camera may further comprise a signal processing circuit for subjecting the image data outputted from the solid-state electronic imaging device to signal processing during the movie image insertion time period immediately after the still image pick-up time period.

The signal processing time period required to perform the signal processing by the signal processing circuit and the movie image insertion time period can be set in an overlapped time period, thereby making it possible to shorten the continuous imaging time period. Further, an interval between movie image insertion time periods can be shortened. Accordingly, a smooth moving image can be obtained.

The digital movie camera may further comprise related data recording control means (a related data recording control device) for recording on the recording medium data for relating the movie image data and the still image data.

Since the related data is recorded on the recording medium, the still image represented by the still image data obtained by the continuous imaging can be inserted into the position of the image missing by the continuous imaging. Accordingly, a smooth movie image is obtained.

The foregoing and other objects, features, aspects and advantages of the present invention will become more apparent from the following detailed description of the present invention when considered in conjunction with the accompanying drawings.

BRIEF DESCRIPTION OF THE DRAWINGS

FIGS. 8 and 9 show another embodiment and are timing charts in a case where a moving image recording mode is set.

DESCRIPTION OF THE PREFERRED EMBODIMENTS

Figure 1:
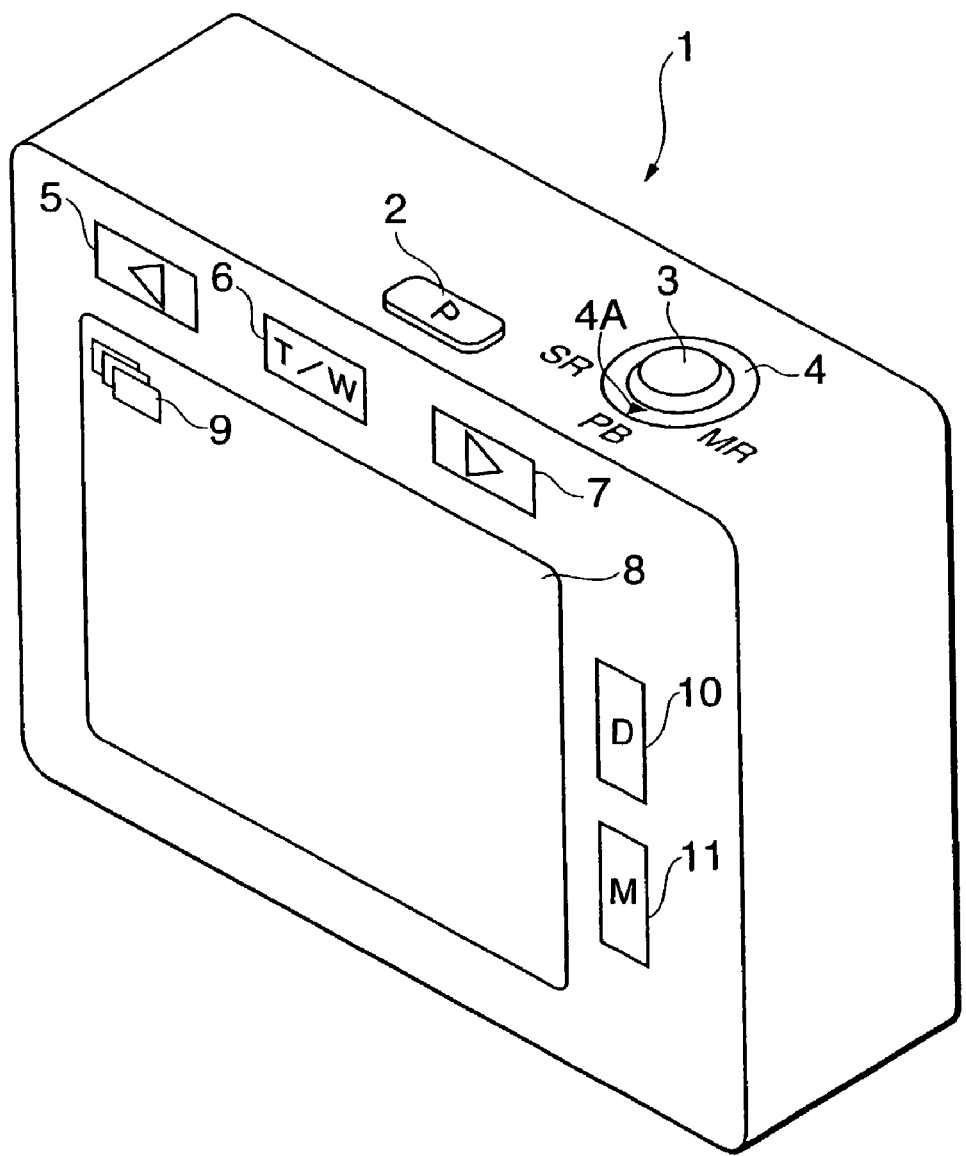
FIG. 1 is a perspective view of a digital still camera as viewed from its rear surface.

FIG. 1 is a perspective view showing an embodiment of the present invention, which illustrates a digital still camera having the function of recording movie (moving) image data as viewed from its rear surface. The digital still camera according to the present embodiment can set a continuous imaging mode while a movie image recording mode for recording movie image data is set, as described in detail later. Continuous imaging and recording can be performed by interrupting the recording of a movie image.

On an upper surface of the digital still camera 1, a power supply button 2 is provided at its approximately central part. A shutter release button 3 is provided on the right side of the power supply button 2. A rotatable mode dial 4 is provided around the shutter release button 3. A mark 4A is formed on the mode dial 4. A still image pick-up mode (SR), a reproduction (playback) mode (PB), or a movie image pick-up mode (MR) can be set depending on the position of the mark 4A.

On a rear surface of the digital still camera 1, a liquid crystal display screen 8 is provided over its entire surface. As described above, the digital still camera 1 can perform continuous imaging. When the continuous imaging mode is set, a continuous imaging mark 9 is displayed at the upper left of the liquid crystal display screen 8. A menu is displayed on the liquid crystal display screen 8. A continuous imaging mode is set from the menu. On the liquid crystal display screen 8, an image which has been picked up, a reproduced image, a lot of thumbnail images, or so forth are displayed.

Above the liquid crystal display screen 8 in the rear surface of the digital still camera 1, there are provided a backward feeding switch 5 pressed by a user when a backward feeding command (a command to return a reproduced frame by one frame, a command to move, when a lot of thumbnail images are displayed, a cursor for designating the thumbnail image leftward, etc.) is inputted, a zoom switch 6 pressed by the user when a zoom command is inputted, and a forward feeding switch 7 pressed by the user when a forward feeding command (a command to advance a reproduced frame by one frame, a command to move the cursor rightward, etc.) is inputted.

A determination switch 10 and a menu switch 11 are provided on the right side of the liquid crystal display screen 8 in the rear surface of the digital still camera 1. The determination switch 10 is pressed by the user when various types of commands such as a command to determine a desired mode from the menu, a command to start and a command to terminate movie image recording in a case where the movie image pick-up mode is set, a command to start movie image reproduction, and a command to terminate movie image reproduction are issued. The menu switch 11 is pressed when the menu is displayed on the liquid crystal display screen 8.

Figure 2:
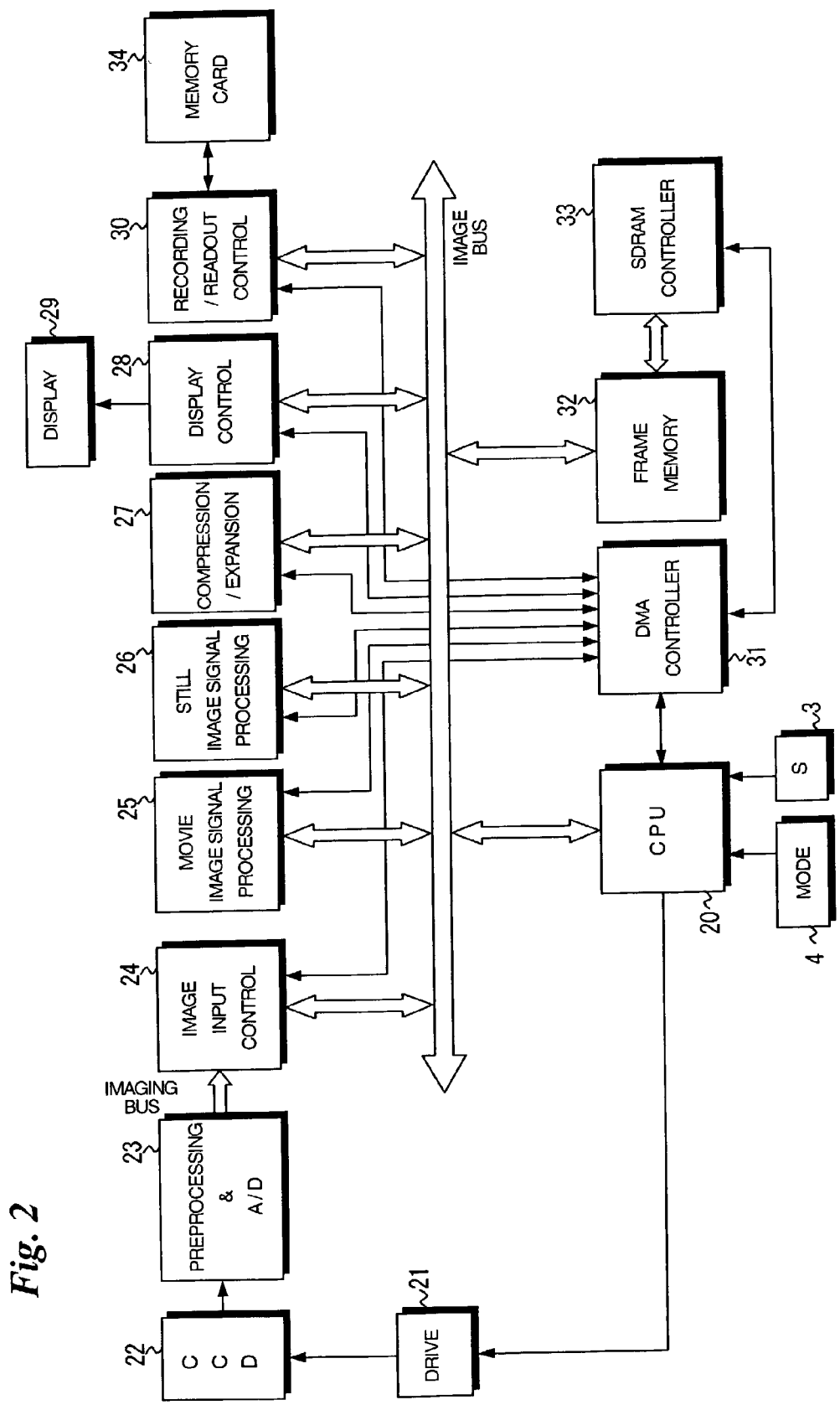
FIG. 2 is a block diagram showing the electrical configuration of a digital still camera.

FIG. 2 is a block diagram showing the electrical configuration of the digital still camera 1.

The overall configuration of the digital still camera 1 is supervised by a CPU 20.

Output signals from the shutter release button 3, the mode dial 4, and so forth, are inputted to the CPU 20.

The digital still camera 1 comprises a DMA (Direct Memory Access) controller 31 for controlling the transfer of and the readout of image data from each of the circuits, and an SDRAM (Synchronous Dynamic Random Access Memory) controller 33 for writing and reading image data to and from a frame memory 32.

When the still image pick-up mode or the movie image pick-up mode is set, a subject is imaged in a period of 1/60 seconds by a CCD (Charge Coupled Device) 22, and a video signal representing an image of the subject is outputted. The CCD 22 is driven in a still image readout mode or a movie image readout mode by a driving circuit 21. In the still image readout mode, a video signal representing an image composed of 1280 pixels in the horizontal direction and 960 pixels in the vertical direction is outputted from the CCD 22. In the movie image readout mode, a video signal representing an image composed of 640 pixels in the horizontal direction and 480 pixels in the vertical direction is outputted from the CCD 22. In the still image readout mode, an image having a higher resolution is obtained, while a time period required to read out the image is long. Contrary to this, in the movie image readout mode, the resolution of an image corresponding to each of frames constituting a movie image is not relatively high, while a time period required to read out the image is short. The still image readout mode is set when a still image is recorded, while the movie image readout mode is set when the movie image is recorded and while it is being picked up.

The video signal outputted from the CCD 22 is subjected to predetermined preprocessing such as white balance control or gamma correction in a preprocessing and analog-to-digital conversion circuit 23, and the analog video signal is converted into RGB digital image data. The digital image data is temporarily stored in the frame memory 32 controlled by the SDRAM controller 33 through an image input control circuit 24 controlled by the DMA controller 31. The image data is read out of the frame memory 32 and is fed to a display control circuit 28. A display device 29 is controlled by the display control circuit 28, so that an image obtained by the imaging is displayed on a display screen 8 of the display device 29.

In a case where the movie image pick-up mode is set, when the determination switch 10 is pressed, a movie image recording mode is set. As described above, image data outputted from the image input control circuit 24 and temporarily stored in the frame memory 32 is inputted to a movie image signal processing circuit 25 under control of the DMA controller 31. In the movie image signal processing circuit 25, processing for producing luminance data and color difference data from the RGB digital image data and other predetermined movie image signal processing are performed. The produced luminance data and color difference data are fed to the frame memory 32, and are temporarily stored therein again.

The luminance data and the color difference data are read out of the frame memory 32, and are inputted to a compression/expansion circuit 27. In the compression/expansion circuit 27, MPEG (Moving Picture Experts Group) compression is performed. The compressed luminance data and color difference data are successively recorded on a memory card 34 under the control of a recording/readout control circuit 30. Such processing is repeated in a period of 1/60 seconds one of frames constituting a movie image at a time. The determination switch 10 is pressed again so that the movie image recording mode is terminated, to return to the movie image pick-up mode.

In a case where the still image pick-up mode is set, when the shutter release button 3 is pressed, the CCD 22 is set to a still image readout mode. Consequently, a video signal representing a still image of a high quality is outputted from the CCD 22, as described above. The video signal is subjected to predetermined preprocessing and digital conversion in the preprocessing and analog/digital conversion circuit 23, and is temporarily stored in the frame memory 32.

The digital image data is read out of the frame memory 32, and is inputted to a still image signal processing circuit 26. In the still image signal processing circuit 26, predetermined still image signal processing such as processing for producing luminance data and color difference data from the digital image data or processing for producing high-frequency luminance data for obtaining a still image having a high resolution is performed. The produced luminance data and color difference data are fed to the frame memory 32, and are stored therein again. The luminance data and the color difference data are read out of the frame memory 32, and are subjected to JPEG (Joint Photographic Experts Group) compression in the compression/expansion circuit 27. The compressed luminance data and color difference data are fed to the frame memory 32, and are stored therein again.

The compressed luminance data and color difference data are read out of the frame memory 32, and are inputted to the recording/readout control circuit 30. The luminance data and the color difference data which have been compressed are recorded as still image data on the memory card 34 under the control of the recording/readout control circuit 30.

When the reproduction mode is set, the image data recorded on the memory card 34 is read out of the recording/readout control circuit 30. The read image data is fed to the frame memory 32, and is temporarily stored therein. The image data is read out of the frame memory 32, and is expanded in the compression/expansion circuit 27. It goes without saying that expansion based on JPEG compression is performed if the read image data is still image data, while expansion based on MPEG compression is performed if it is movie image data. The expanded image data is fed to the frame memory 32 again, and is stored therein. The image data is read out of the frame memory 32, and is fed to the display control device 28. Consequently, the selected still image or movie image is displayed on the display screen 8 of the display device 29.

Figure 3:
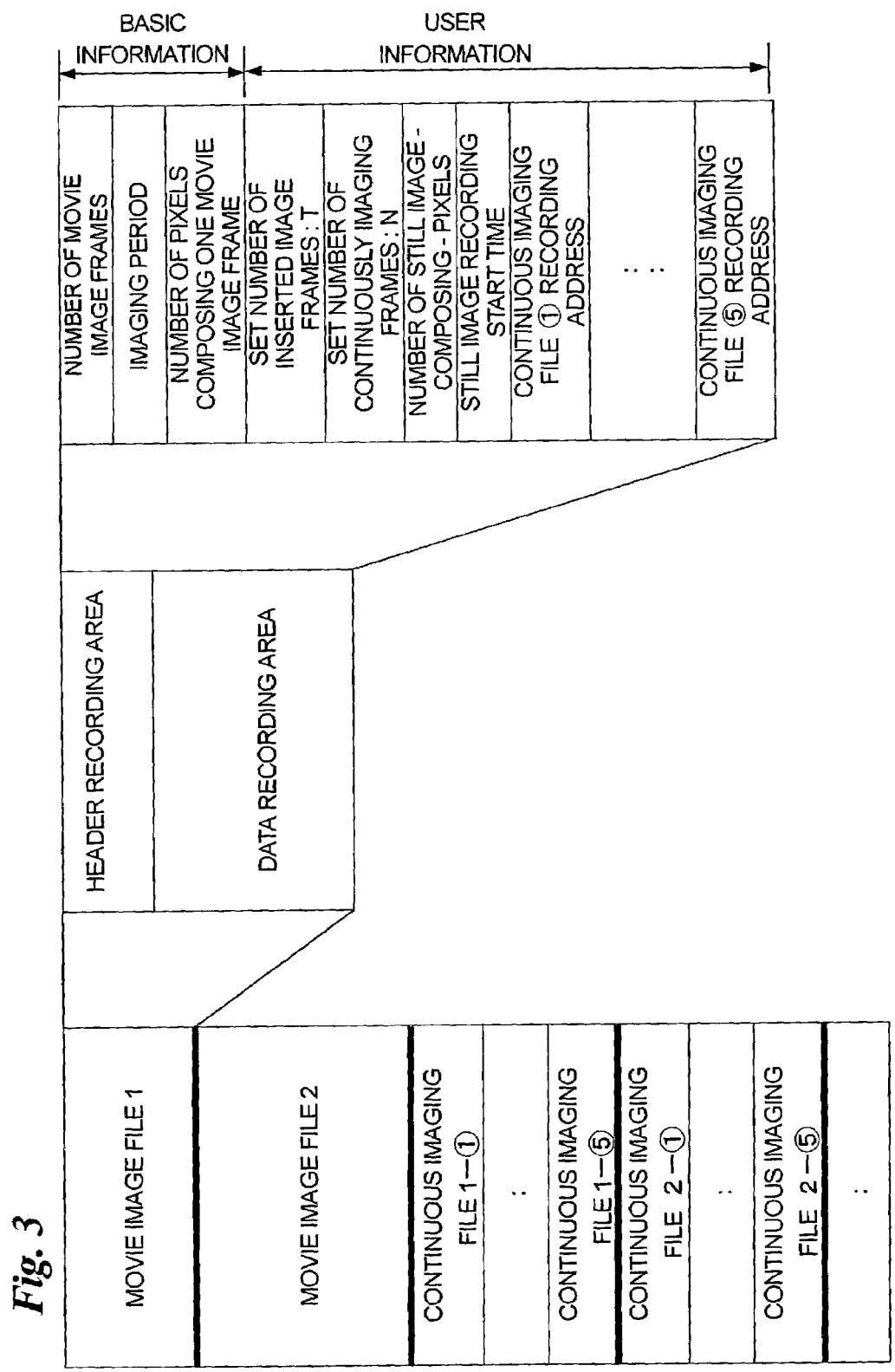
FIG. 3 illustrates recording areas in a memory card.

FIG. 3 illustrates recording areas of the memory card 34.

The memory card 34 includes a plurality of movie image files storing movie image data and a plurality of continuous imaging files storing still image data, as illustrated on the left side. In the present embodiment, the number of continuously imaged frames is five, and the five continuous imaging files (①) to ⑤)) constitute one set. Still images corresponding to five frames are obtained by the continuous imaging, and one continuous imaging file storing data representing the still image corresponding to each of the frames is obtained.

As illustrated in the center, the movie image file includes a header recording area and a data recording area. Header information is recorded in the header recording area, and movie image data is recorded in the data recording area.

The header information includes basic information and user information, as illustrated on the right side. The basic information has the number of movie image-constituting-frames (the number of frames constituting a movie image represented by one movie image file), an imaging period (1/60 seconds), and the number of pixels composing one of movie image-constituting-frames (the respective numbers of pixels in the horizontal direction and the vertical direction composing an image corresponding to one of frames constituting a movie image) recorded thereon. The user information has the set number of inserted movie image frames F (described in detail later), the set number of continuously imaging frames N (five frames, as described above), the number of still image-composing-pixels (the respective numbers of pixels in the horizontal direction and the vertical direction in a case where a still image is obtained in a still image pick-up mode), the time when the recording of a still image is started (still image recording start time), and a continuous imaging file recording address in a case where there is a corresponding continuous imaging file recorded thereon.

Figure 4:
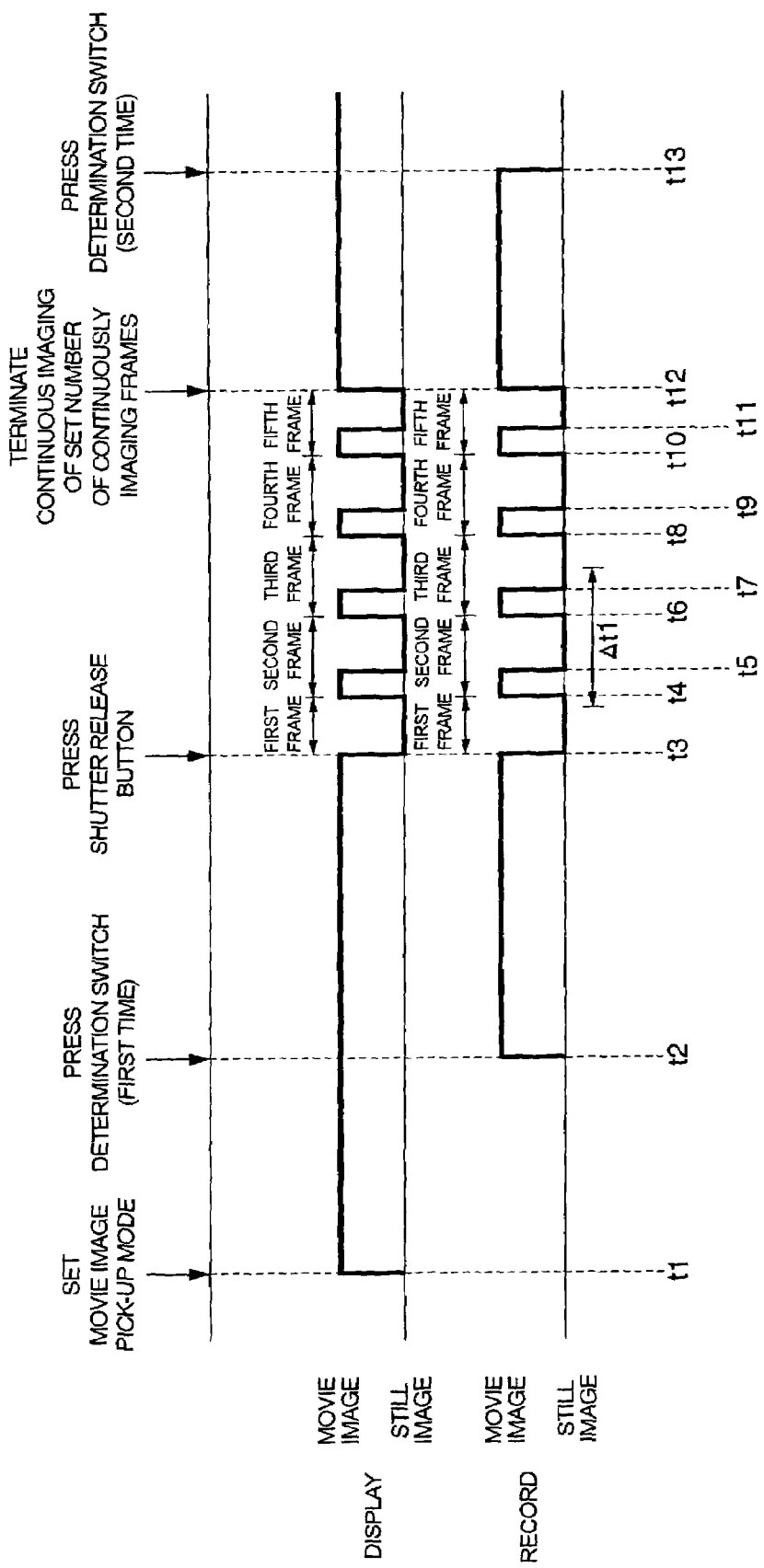
FIGS. 4 and 5 are timing charts in a case where a movie image recording mode is set.
Figure 5:
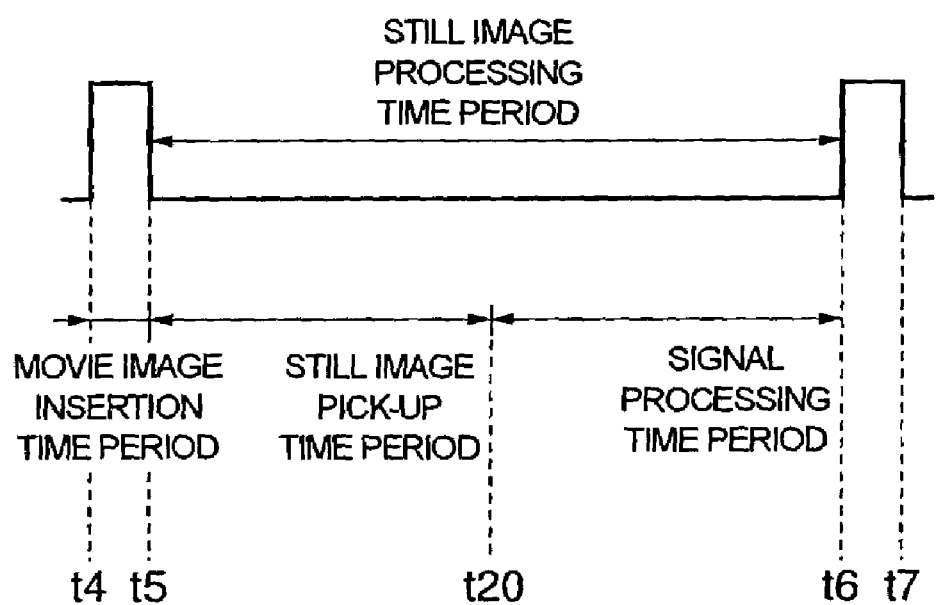
Figure 6:
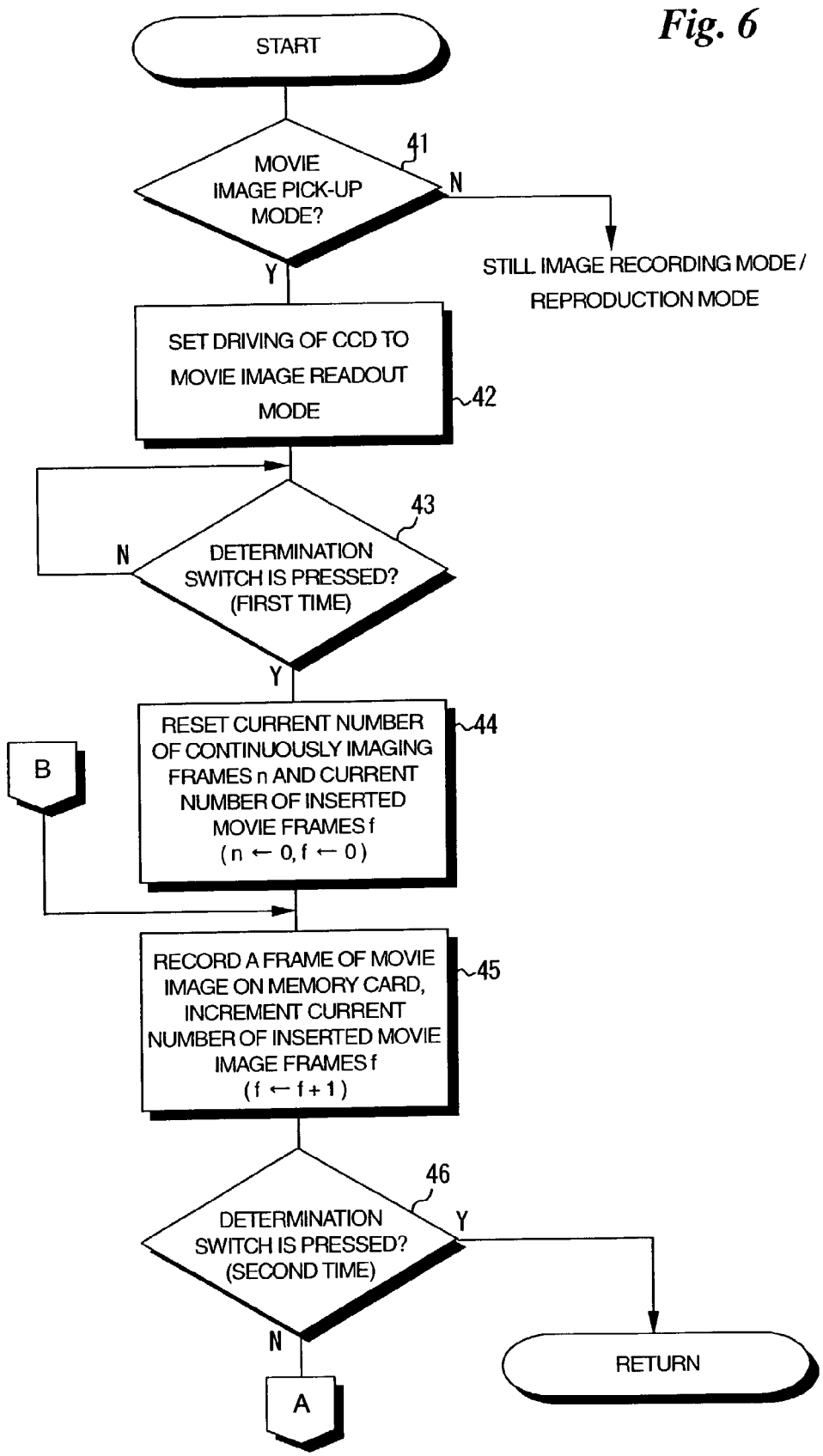
FIGS. 6 and 7 are flow charts showing the procedure for processing of a digital still camera.
Figure 7:
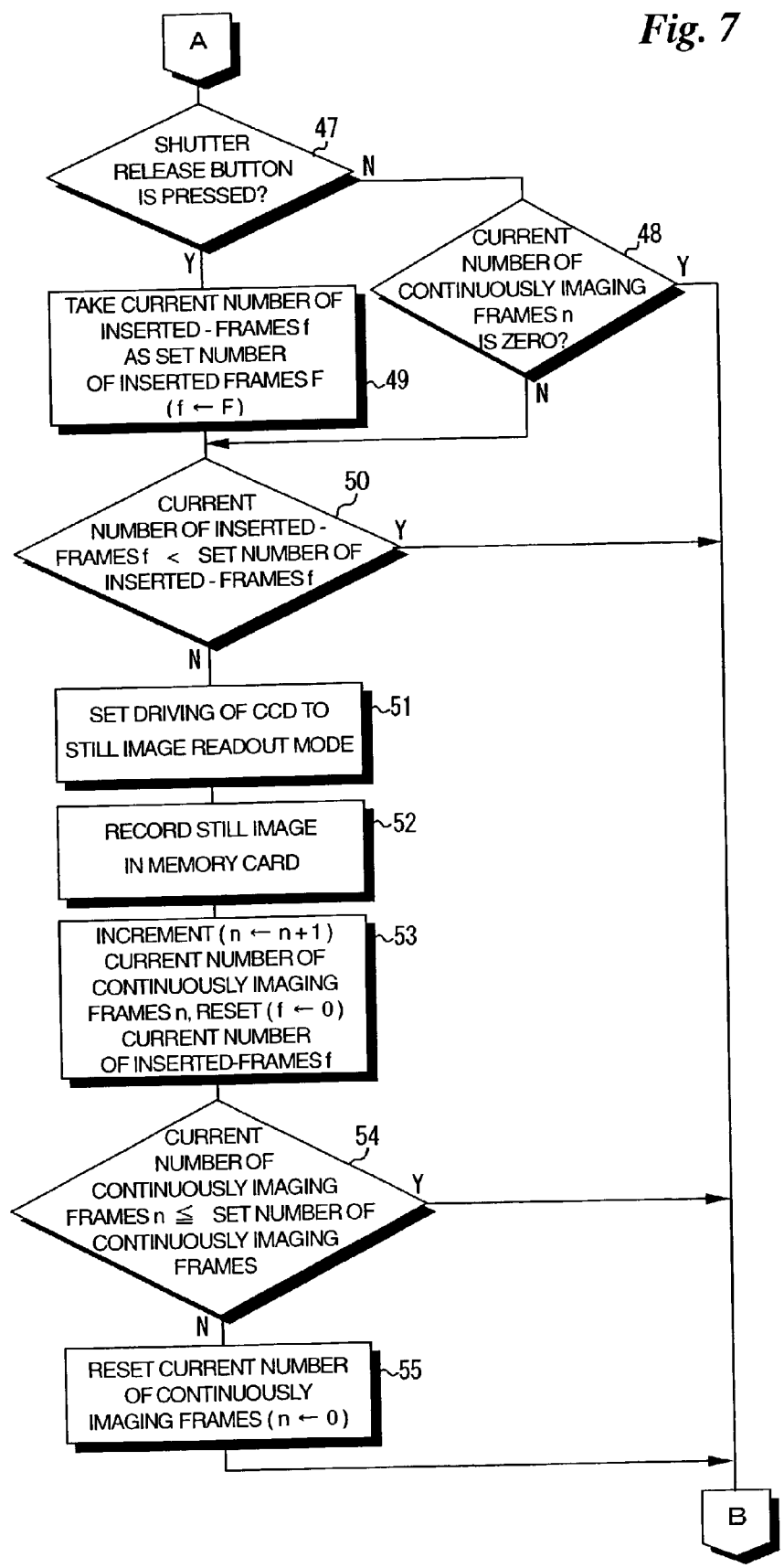

FIG. 4 is a timing chart in a case where the movie image pick-up mode is set in the digital still camera 1, FIG. 5 is a timing chart showing in enlarged fashion a portion Δt1 of the timing chart shown in FIG. 4, and FIGS. 6 and 7 are flow charts showing the procedure for processing in the digital still camera 1.

In the digital still camera 1 according to the present embodiment, the movie image recording may be interrupted for performing the operation of the continuous imaging mode by pressing the shutter release button 3 when the movie image recording mode is set so that a movie image is being recorded, as described above. When the movie image recording is interrupted for executing the continuous imaging mode operation, a still image and a movie image are alternately recorded until still images corresponding to the set number of continuously imaging frames N are obtained. On the display screen 8, the still images are not always displayed while the still images corresponding to the number of continuously imaging frames N are being obtained. That is, the still image is displayed while it is being recorded, while the movie image is displayed until the still image corresponding to the succeeding frame is recorded. Consequently, it is relatively easy to follow a main subject by seeing the subject image displayed on the liquid crystal display screen 8. It is hereinafter assumed that the continuous imaging mode is set by the user, and the number of continuously imaging frames N is set to five, and the number of inserted movie image frames F (the number of frames corresponding to images constituting a movie image recorded between still image recording intervals by continuous imaging) is set to two.

It is first assumed that a movie image pick-up mode is set by the mode dial 4 at the time t1 (YES in step 41). Consequently, the CCD 22 (the driving circuit 21) is set to a movie image readout mode, in which a subject is imaged in a period of 1/60 seconds (step 42). On the liquid crystal display screen 8, an image of the subject is displayed as a movie image.

It is assumed that the determination switch 10 is pressed by the user at the time t2 (YES in step 43). Consequently, the digital still camera 1 enters a movie image recording mode. When the movie image recording mode is set, the current number of continuously imaging frames n and the current number of inserted movie image frames f are respectively reset (n=0, f=0).

The subject is imaged in a period of 1/60 seconds, and image data obtained in the above-mentioned manner are subjected to signal processing, are compressed, and are successively recorded on the memory card 34. Every time image data corresponding to one of frames constituting the movie image is recorded on the memory card 34, the current number of inserted movie image frames f is incremented (step 45).

When the determination switch 10 is pressed for the second time (YES in step 46), the movie image recording mode is terminated. If the determination switch 10 is not pressed for the second time (No in step 46), it is judged whether or not the shutter release button 3 is pressed (step 47).

If the shutter release button 3 is not pressed (No in step 47) even in a case where the digital still camera 1 is in the movie image recording mode, it is confirmed whether or not the current number of continuously imaging frames n is zero (step 48). Unless the shutter release button 3 is pressed, the current number of continuously imaging frames is zero (YES in step 48). Accordingly, the processing in the step 45 and the subsequent steps is repeated. Consequently, the recording of movie image data is repeated in a period of 1/60 seconds.

When the shutter release button 3 is pressed (YES in step 47) in a case where the digital still camera 1 is in the movie image recording mode, the current number of inserted movie image frames f is taken as the set number of inserted movie image frames F (step 49). This is for starting a continuous imaging mode at the moment when the shutter release button 3 is pressed.

It is then confirmed whether or not the current number of inserted movie image frames f is less than the set number of inserted movie image frames F (step 50). When the shutter release button 3 is pressed, the current number of inserted movie image frames f is taken as the set number of inserted movie image frames F. Accordingly, the answer is in the negative in the step 50. Consequently, the driving of the CCD 22 is set to a still image readout mode (step 51), in which a subject corresponding to the first frame in the continuous imaging mode is imaged. Still image data obtained by the imaging is fed to the memory card 34, and is stored in the first continuous imaging file in the set of five continuous imaging files and is recorded thereon (step 52).

Since the subject corresponding to the first frame in the continuous imaging mode is imaged, the current number of continuously imaging frames n is incremented, and the current number of inserted movie image frames f is reset (step 53). It is for recording movie image data on the memory card 34 in a movie image insertion time period elapsed from the time when the still image corresponding to the first frame is picked up to the time when the still image corresponding to the succeeding second frame is picked up and displaying the movie image on the liquid crystal display screen 8 that the number of inserted movie image frames f is reset.

If the current number of continuously imaging frames n is not more than the set number of continuously imaging frames N (YES in step 54), the processing in the step 45 and the subsequent steps is repeated in order to perform the remaining continuous imaging. Between the picking-up and recording of a preceding still image and the picking-up and recording of a succeeding still image, the recording of the movie image data is repeated until the current number of inserted movie image frames f reaches the set number of inserted movie image frames F again. When the image corresponding to the first frame in the continuous imaging mode has been recorded, the current number of continuously imaging frames n is one. Accordingly, the answer is in the negative in the step 48. When the current number of inserted movie image frames f is not less than the set number of inserted movie image frames F (NO in step 50), therefore, the continuous imaging is performed again.

In this way, when the shutter release button 3 is pressed while the movie image is being recorded, the continuous imaging mode is started, in which a still image of a high quality is obtained (a still image processing time period; times t3 to t4, t5 to t6, t7 to t8, t9 to t10, and t11 to t12). Movie image data is recorded between still image pick-up intervals in continuous imaging (a movie image insertion time period;

times t4 to t5, t6 to t7, t8 to t9, and t10 to t11). Further, the movie image is displayed on the liquid crystal display screen 8 at the still image pick-up intervals in the continuous imaging. Accordingly, a main subject can be followed while seeing an image displayed on the liquid crystal display screen 8. Even when a main subject which is moving is continuously imaged, the main subject can be prevented from being lost. As shown in FIG. 5 a still image is picked up in a still image pick-up time period (times t5 to t20) which is the first half of the still image processing time period (a time period between movie image insertion time periods), and signal processing for obtained still image data is performed in a signal processing time period (times t20 to t6) which is the latter half of the still image processing time period. The signal processing may be performed within the movie image insertion time period, as described later.

When the continuous imaging of the set number of continuously imaging frames N is terminated at the time t12 (NO in step 54), the current number of continuously imaging frames n is reset (step 55).

Thereafter, the program is returned to the processing in the step 45, in which the movie image recording mode is set again. The movie image data is recorded again.

When the determination switch 10 is pressed for the second time at the time t13 (YES in step 46), the movie image recording mode is terminated, and the recording of the movie image data on the memory card 34 is also stopped.

When the movie image recording mode is interrupted by the continuous imaging, the movie image files and the continuous imaging files are recorded on the memory card 34, as shown in FIG. 3. At the time of reproduction, the movie image data is produced such that the still image represented by the continuous imaging file is inserted in the movie image represented by the moving image file at a timing corresponding to the timing when it is recorded. While the movie image is being recorded, a frame representing the still image is prevented from missing, so that the movie image to be reproduced is made smoother. It goes without saying that the size (resolution) of the still image is changed to the size of the image corresponding to one of frames constituting the movie image in the reproduction and display of the still image.

FIG. 8 is a timing chart showing another embodiment, in a case where a movie image pick-up mode is set in the digital still camera 1, and FIG. 9 is a timing chart showing in enlarged fashion a portion Δt2 of the timing chart shown in FIG. 8. In FIG. 9, a timing chart related to transfer/readout to/from a still image signal processing circuit and transfer/readout to/from a compression/expansion circuit for a still image shown in FIG. 8 are omitted.

In the above-mentioned embodiment, pick-up of a still image (a still image pick-up time period) and signal processing (a signal processing time period) are performed in a still image processing time period. Therefore, there is a limit to the decrease at continuous imaging intervals (in a continuous imaging time period). Since the still image processing time period is relatively long, the ratio of the still image processing time period in the display on the liquid crystal display screen 8 is increased during the continuous imaging mode. Accordingly, the movement of the moving image may not, in some cases, be smoothed.

In the embodiment shown in FIGS. 8 and 9, a still image processing time period is shortened, to shorten a time period during which a still image is displayed in a continuous imaging mode. Specifically, signal processing is performed during a movie image insertion time period. A still image pick-up time period is the same as the still image processing time period, so that the time period during which the still image is displayed in the continuous imaging mode is shortened. A moving image which is relatively smooth is displayed.

In the present embodiment, the bus width of an image bus is larger than the bus width of an imaging bus in the above-mentioned digital still camera 1 (see FIG. 2). Used as the imaging bus is one whose bus width is composed of 12 bits (the amount of data which can be simultaneously transmitted is 12 bits), and used as the image bus is one whose bus width is composed of 32 bits. The bus width of the image bus is larger than the bus width of the imaging bus. Accordingly, data can be transferred in the image bus in a more shorter time period than a time period during which data is transferred in the imaging bus, provided that the respective amounts of the data are the same, by using a clock pulse having a high clock frequency. When the data is transferred in the imaging bus, for example, the transfer is performed on the basis of a clock pulse having a clock frequency of 12 MHz. On the other hand, when the data is transferred in the image bus, the transfer is performed on the basis of a clock pulse having a clock frequency of 100 MHz.

Image data corresponding to one horizontal scanning line is inputted to the image input control circuit 24 through the imaging bus. In the image input control circuit 24, the arrangement of the image data is converted such that an arrangement suitable for the bus width composed of 12 bits is changed to an arrangement suitable for the bus width composed of 32 bits. The image data whose arrangement has been converted is stored in the frame memory 32, as described above, through the image bus.

It is assumed that the movie image pick-up mode is set, and the digital still camera 1 is in a movie image recording mode by pressing the determination switch 10. Further, it is assumed that the shutter release button 3 is pressed at the time t35.

The movie image recording mode is set until the shutter release button 3 is pressed at the time t35. Therefore, the CCD 22 is set to a movie image readout mode, in which the imaging of a subject is repeated in a period of 1/60 seconds (=16.6 ms) . When a subject for a movie image is imaged (movie image pick-up mode, movie image recording mode), a vertical synchronizing signal is outputted in a period of 1/60 seconds. When a subject for a still image is imaged (still image pick-up mode), vertical synchronizing signal output intervals are 120 ms.

When the movie image recording mode is set, the vertical synchronizing signal is outputted at the time t31. Obtained movie image data is outputted from the image input control circuit 24 one horizontal scanning line at a time, and is fed to the frame memory 32 between the time t32 to the time t33. Between the time t32 and the time t33, the movie image data is read out of the frame memory 32 one horizontal scanning line at a time, and is fed to the movie signal processing circuit 25. The movie image data which has been subjected to movie image signal processing is read out of the movie image signal processing circuit 25, and is fed to the frame memory 32. Further, between the time t32 to the time t33, the movie image data is read out of the frame memory 32 one horizontal scanning line at a time, is subjected to MPEG compression in the compression/expansion circuit 27, and is fed to the frame memory 32 again. The compressed image data is read out of the frame memory 32, is fed to the recording/readout control circuit 30 through the image bus, and is recorded on the memory card 34.

More specifically, as shown in FIG. 9, between the time t51 and the time t52, the image data corresponding to one horizontal scanning line outputted from the image input control circuit 24 is fed to the frame memory 32 through the image bus. Between the time t52 and the time t53, the image data corresponding to one horizontal scanning line stored in the frame memory 32 is read out, is inputted to the movie image signal processing circuit 25, is subjected to movie image signal processing, and is fed to the frame memory 32 through the image bus. Between the time t53 and the time t54, the image data corresponding to one line is read out of the frame memory 32, and is fed to the compression/expansion circuit 27. Between the time t54 and the time t55, image data corresponding to one line is read out of the frame memory 32, and is fed to the recording/readout control circuit 30. The image data are thus transferred in a time-sharing manner, thereby making it possible to prevent the image data from colliding with each other on the image bus. Moreover, the image bus has a bus width larger than that of the imaging bus and has a transfer speed higher than that thereof. Accordingly, the image data corresponding to one line can be transferred to a plurality of types of circuits within the output period of a horizontal synchronizing signal. The period of the horizontal synchronizing signal is approximately 63.5 µs from the time t51 to the time t56.

When the shutter release button 3 is pressed at the time t36, the CCD 22 is brought into a still image readout mode. The obtained still image data is transferred to the still image signal processing circuit 26 and is read out of the still image signal processing circuit 26 between the time t37 and the time t39. Between the time t39 and the time t41, the still image data is transferred to the compression/expansion circuit 27, and is read out of the compression/expansion circuit 27. Further, between the time t41 and the time t43, the still image data is fed to the recording/readout control circuit 30, and is recorded on the memory card 34.

It goes without saying that the still image data are also transferred and read out of each circuit in a time sharing manner, as shown in FIG. 9, similarly to the movie image data.

During the movie image insertion time period in the continuous imaging, the still image is thus picked up, and the still image data is not subjected to signal processing. Accordingly, the interval between the moving image insertion time periods is shortened. Further, the continuous imaging speed can be also improved.

Although the present invention has been described and illustrated in detail, it is clearly understood that the same is by way of illustration and example only and is not to be considered by way of limitation, the spirit and scope of the present invention being limited only by the terms of the appended claims.

What is claimed is:

1. A digital movie camera comprising:
    an imaging device including a solid-state electronic imaging device for imaging a subject and outputting image data representing an image of the subject;
    a first driving device for driving said solid-state electronic imaging device such that the subject is imaged in a predetermined period and movie image data is read out and movie image recording is performed in response to the setting of a movie image recording mode;
    a movie image recording control device for recording image data representing the movie image read out of said solid-state electronic imaging device under driving by said first driving device as movie image data on a recording medium;
    a second driving device for driving said solid-state electronic imaging device such that the subject is continuously imaged at timing corresponding to a continuous imaging time period and still image data is read out in response to the setting of a continuous imaging mode during operations by said movie image recording mode;
    a still image recording control device for recording image data representing the still image read out of said solid-state electronic imaging device under driving by said second driving device as still image data on the recording medium; and
    a signal processing unit that processes a signal of a still image during a movie image insertion period of said continuous imaging time period in which a movie image is recorded, a still image and a movie image being alternately recorded when said movie image recording is interrupted to perform a continuous imaging operation;
    a driving control device for controlling said first driving device such that the subject is imaged in a predetermined period within a movie image insertion time period which is a part of said continuous imaging time period, and the movie image data is read out;
    a display device for displaying the subject image represented by the image data outputted from said imaging device;
    a buffer memory successively temporarily storing image data corresponding to a plurality of frames outputted from said imaging device;
    a readout device for reading out the image data stored in said buffer memory and feeding the read image data to said display device; and
    a readout control device for controlling, in a still image processing time period excluding said movie image insertion time period in said continuous imaging time period, said readout device such that said display device displays the image of the subject which is imaged during the movie image insertion time period immediately before said still image processing time period.

2. The digital movie camera according to claim 1, wherein said still image processing time period comprises:
    a still image pick-up timer period required to image the subject and read out the image data from said solid-state electronic imaging device; and
    a signal processing time period required to subject the image data outputted from said solid-state electronic imaging device to signal processing.

3. The digital movie camera according to claim 1, wherein said still image processing time period is equal to a still image pick-up time period required to image the subject and read out the image data from said solid-state electronic imaging device, and
    wherein said digital movie camera further comprises:
    a signal processing circuit for subjecting the image data outputted from said solid-state electronic imaging device to signal processing during said movie image insertion time period immediately after said still image pick-up time period.

4. The digital movie camera according to claim 1, further comprising:
    a related data recording control device for recording on said recording medium data for relating said movie image data and said still image data.

5. The digital movie camera according to claim 1, wherein said first driving device drives said solid-state electronic imaging device differently than said second driving device.

6. A digital movie camera comprising:
    an imaging device including a solid-state electronic imaging device for imaging a subject and outputting image data representing an image of the subject;
    a first driving device for driving said solid-state electronic imaging device such that the subject is imaged in a predetermined period and movie image data is read out and movie image recording is performed in response to the setting of a movie image recording mode;

a movie image recording control device for recording image data representing the movie image read out of said solid-state electronic imaging device under driving by said first driving device as movie image data on a recording medium;

a second driving device for driving said solid-state electronic imaging device such that the subject is continuously imaged at timing corresponding to a continuous imaging time period and still image data is read out in response to the setting of a continuous imaging mode during operations by said movie image recording mode;

a still image recording control device for recording image data representing the still image read out of said solid-state electronic imaging device under driving by said second driving device as still image data on the recording medium;

a signal processing unit that processes a signal of a still image during a movie image insertion period of said continuous imaging time period in which a movie image is recorded, a still image and a movie image being alternately recorded when said movie image recording is interrupted to perform a continuous imaging operation;

a display device for displaying a menu; and a determination switch for selecting said continuous imaging mode from said menu.

7. The digital movie camera according to claim 1, further comprising:

a shutter release button for setting said imaging device to a still image readout mode such that a video signal comprising said still image data is output from said imaging device.

8. The digital movie camera according to claim 7, wherein depressing said shutter release button when said movie image recording mode is set causes a movie image recording to be interrupted to perform a continuous imaging operation.

9. The digital movie camera according to claim 2, wherein said still image pick-up time period comprises a first half of said still image processing time period.

10. The digital movie camera according to claim 2, wherein a signal processing time period comprises a second half of said still image processing time period.

11. The digital movie camera according to claim 1, further comprising:

a control circuit for controlling a reproduction of said movie image data which is recorded on said recording medium, wherein said movie image data is reproduced such that said still image data is inserted in said movie image data during said reproduction.

12. The digital movie camera according to claim 1, wherein said driving control device controls said first driving device such that said movie image insertion time period precedes said still image pick-up time period during a continuous imaging operation.

13. The digital movie camera according to claim 1, wherein said still image data comprises data for providing an image having a higher resolution than said movie image data.

14. The digital movie camera according to claim 13, wherein said first driving device drives said solid-state electronic imaging device such that said movie image data is read out of said solid-state electronic imaging device, and said second driving device drives said solid-state electronic imaging device such that said still image data is read out of said solid-state electronic imaging device.

15. The digital movie camera according to claim 1, further comprising:

a display device for generating a display based on said image data, said display device displaying said still image while said still image is being recorded and displaying said movie image until a still image corresponding to a succeeding frame is recorded.

16. The digital movie camera according to claim 6, wherein said display device displays a continuous imaging mark when said continuous imaging mode is set.

17. The digital movie camera according to claim 6, further comprising:

a mode dial which is different from said detennination switch, for setting a still image pick-up mode, a reproduction mode, and a movie image pick-up mode.

* * * * *